United States Patent
Niederer et al.

(10) Patent No.: US 8,729,433 B2
(45) Date of Patent: May 20, 2014

(54) ELECTRICAL HEATING DEVICE AND METHOD FOR THE PRODUCTION THEREOF

(75) Inventors: Michael Niederer, Kapellen-Drusweiler (DE); Franz Bohlender, Kandel (DE)

(73) Assignee: Eberspacher catem GmbH & Co. KG, Herxheim (DE)

(*) Notice: Subject to any disclaimer, the term of this patent is extended or adjusted under 35 U.S.C. 154(b) by 317 days.

(21) Appl. No.: 12/878,144

(22) Filed: Sep. 9, 2010

(65) Prior Publication Data
US 2011/0068097 A1   Mar. 24, 2011

(30) Foreign Application Priority Data
Sep. 22, 2009 (EP) .................................... 09012049

(51) Int. Cl.
*H05B 3/02* (2006.01)

(52) U.S. Cl.
USPC ........................................................ 219/538

(58) Field of Classification Search
USPC ......... 219/428, 385, 392, 532, 536, 540, 504, 219/548, 201, 505, 202; 123/549, 556; 24/619; 220/787; 392/347, 442; 73/514.18; 160/197; 49/116, 120; 187/335; 60/520

See application file for complete search history.

(56) References Cited

U.S. PATENT DOCUMENTS

| 7,081,600 B2 * | 7/2006 | Brown et al. .................. 219/428 |
| 7,667,165 B2 * | 2/2010 | Bohlender et al. ............ 219/536 |
| 2005/0072774 A1 | 4/2005 | Bohlender |
| 2005/0230377 A1 | 10/2005 | Bohlender et al. |
| 2009/0026191 A1 | 1/2009 | Bohlender et al. |

FOREIGN PATENT DOCUMENTS

| DE | 199 11 547 A1 | 9/2000 |
| DE | 101 43 852 A1 | 4/2003 |
| EP | 1 571 325 A1 | 9/2005 |

OTHER PUBLICATIONS

European Search Report Dated Jan. 18, 2010 for European Patent Application Serial No. EP 09 01 2049.

* cited by examiner

*Primary Examiner* — Dana Ross
*Assistant Examiner* — Renee L Miller
(74) *Attorney, Agent, or Firm* — Boyle Fredrickson, S.C.

(57) ABSTRACT

An electrical heating device includes an open housing in which a layer structure is held under tension. The layer structure includes at least one radiator element and at least one heat emitting element with at least one PTC heating element. The layer structure further includes at least one spring element holding the layer structure in the housing under tension. The spring element is provided adjacent to a spring counter element. Spring tongues, formed on the spring element, interact with matching receptacles on the spring counter element. Displacement of the spring element in a direction essentially parallel to the planes of the layer structure stresses the layer structure within the housing. A method of assembling an electrical heating device is also disclosed.

13 Claims, 4 Drawing Sheets

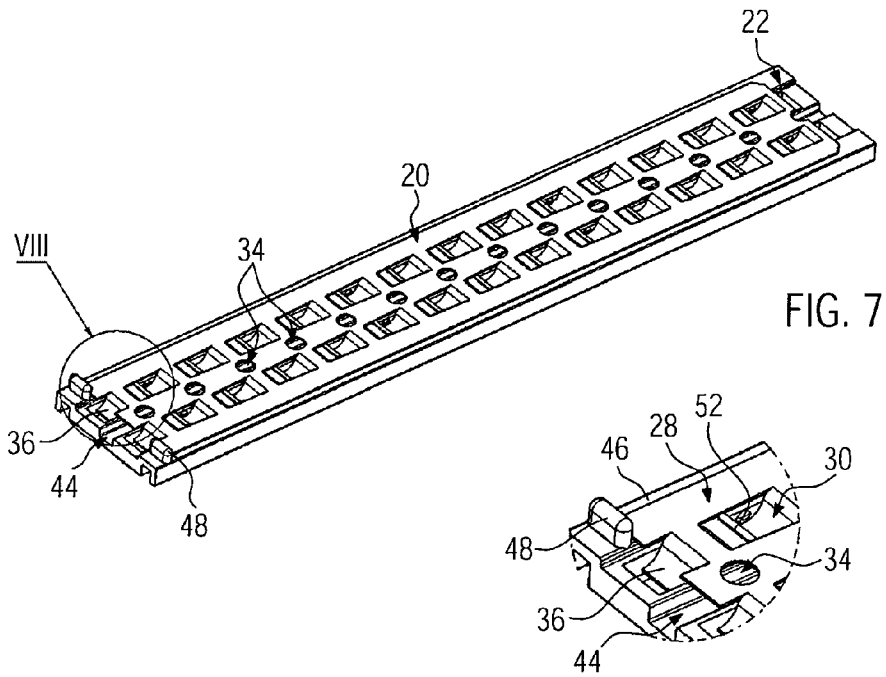
FIG. 7
FIG. 8
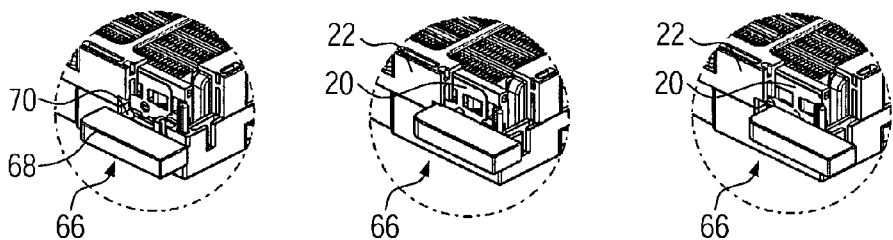
FIG. 11a  FIG. 11b  FIG. 11c

ELECTRICAL HEATING DEVICE AND METHOD FOR THE PRODUCTION THEREOF

BACKGROUND OF THE INVENTION

1. Field of the Invention

This invention relates to an electrical heating device and a method for the manufacture of a device of this nature.

2. Description of the Related Art

A generic electrical heating device has an open housing, in which a layer structure with at least one radiator element, at least one heat emitting element and at least one PTC element, as well as at least one spring element are accommodated. The spring element is accommodated in the housing such that it holds the layer structure under spring tension in the housing. Furthermore, in the housing a plurality of contacts, which are electrically connected to the at least one PTC element, are mounted in an insulated manner. These contacts are normally formed as sheet metal bands and are provided extending in the longitudinal direction of the layer structure as part of the said bands. The housing is an open housing, i.e. it is normally formed with oppositely situated housing openings between which the layer structure is provided.

An auxiliary heater of this nature for conditioning the air in the interior of a motor vehicle is for example known from EP-A1-1 564 503. The layer structure comprising the radiator elements and the heat emitting elements is normally also designated as a heating block. The spring element is essentially located at the level of the heating block, i.e. between the upper and lower sides formed by the heating block, so that the spring force exerted by the spring element is essentially introduced centrally in the heating block.

The heating block of the generic electrical heating device normally comprises a plurality of parallel layers of heat emitting and heat generating elements. The heat generating elements of the heating block normally comprise several PTC heating elements which are provided in one plane one above the other, and are arranged between strip conductors which are normally formed by sheet metal bands. These strip conductors carry current with different polarities. The PTC heating elements can be glued to these strip conductors. It is also possible for the strip conductors to contact the PTC heating elements under tension. In any case it must be ensured that for extracting the heat produced by the PTC heating elements and for feeding current, good contact between the strip conductors and the PTC heating elements exists.

One or more heat generating elements can be provided as part of the heating block. The heat produced by the heat generating elements is dissipated through the heat emitting elements to the medium to be heated, i.e. the air. It flows through the housing through the two frame openings which, between them, accommodate the flat heating block. The frame openings here lie normally parallel to one another on oppositely situated sides of an essentially flat, frame-shaped housing. With regard to the most economical manufacture of the electrical heating device, the heat emitting elements are generally formed from meander-type bent sheet strips, which form corrugated ribs. These corrugated ribs contact heat emitting elements on one or both sides. Consequently, the heating block comprises several layers of heat emitting and heat generating elements, whereby it must also be ensured with regard to the thermal emission that the heat emitting elements have a good contact to the heat generating elements. Also in this respect, the heat emitting elements can be permanently joined to the heat generating elements and/or they can contact one another under tension through at least one spring element accommodated in the housing.

Instead of a meander-type sheet metal band, the heat emitting element can also be formed by an extruded aluminium profile, which forms ridges, which extend essentially at right angles to the layers of the layer structure comprising the heat emitting and the heat generating elements. In a case of this nature the strip conductor, i.e. the generally flat locating face, for the PTC heating element can be formed by the outer surface of an extruded aluminium profile of this nature. With both alternatives, corrugated rib element or extruded profile, the locating faces for the PTC heating elements are formed electrically conducting and are electrically connected to contacts which are normally mounted in the housing insulated from one another. In the first case the contacts are generally formed by the exposed ends of the sheet metal bands.

The layered heating block consisting of parallel heat emitting and heat generating elements, optionally with an additional one or more spring elements extending parallel to it, is preferably mounted in a housing with a U-shaped cross-section. When the layer structure is subjected to the pressure of a spring, the frame has to be dimensioned such that the spring force can be continuously maintained even at increased temperatures. Here it should be noted that the insulating frame is nowadays manufactured as a plastic injection moulded part, due partially to reasons of economy. Normal housings nowadays consist of a housing lower part and a housing upper part. The housing lower part here forms a receptacle for the individual elements of the heating block and, where required, of the spring element. The individual elements of the heating block are arranged in this housing lower part. Then the heating block is enclosed in the housing by joining the housing upper part and the housing lower part. To achieve this, edges which surround the frame openings can partially cover the heating block so that the heating block is enclosed between the frame openings and mounted in the housing. The two housing parts are then joined together, for example using a latching connection.

Furthermore, the housing itself should be able to be manufactured as simply as possible with regard to an economical manufacture of the electrical heating device. Here however, the particular requirements for the practical installation of one or more spring elements in the housing have to be followed when on joining the housing parts the heating block is already subjected to prestressing in the frame so that joining has to take place against this prestressing.

With EP-A1-1 432 287 a suggested solution has already been made by this applicant in which all parts forming the heating block are first inserted into the housing, the housing is then closed and thereafter a spring element, through which the layers of the heating block contact one another under the tension of this spring, is introduced from the face side of the housing through a channel. With this prior art suggested solution the layers of the heating block are first integrated into the housing without tension.

With the method known from EP-A1-1 564 503 for the production of the electrical heating device the elements forming the heating block are fitted into a housing part. Also, the spring element is fitted into the housing part. Then the housing is closed by fitting a further housing part onto the first housing part. According to the teaching of EP-A1-1 564 503, the spring element is only put under tension on closing the housing and in fact by displacement elements, which are moulded on the further housing part and act against the spring element. This displacement element forms an oblique surface on which the spring element slides past with its free upper limb. The spring element is here pivoted in the direction of the heating block about a support within the first housing part and finally tensioned to generate a tensile force.

This prior art suggestion leads to a certain simplification during assembly, which however requires that the elements of the heating block, as also the spring element, are brought into the correct positions in the housing lower part. Also, the housing implemented with this electrical heating device has various oblique surfaces, which are required for stressing and enclosing the spring element when joining the housing parts. Furthermore, the spring element must be formed in a relatively complex manner so that it fulfils its set task. A further development which essentially follows the provisions of EP-A1-1 564 503 is known from EP-A1-2 017 546. Also with this state of the art the layers of the layer structure are first introduced into the housing without being under tension. The spring element is meanwhile positioned above the plane comprising the layer structure and is displaced into the plane containing the layer structure when the housing is closed by joining the top part of the housing to the bottom part of the housing. Accordingly, on closing the housing to encase the heating block the spring element is brought into its installation position and put under tension.

As the earlier suggestions quoted above as examples show, professional circles continually endeavour to provide suggested solutions to facilitate assembly of the electrical heating device essentially without tension. In particular the elements forming the layer structure should be used initially free of tension in a housing part. The tensioning of the spring occurs in a last step in the method, i.e. after closure of the housing, preferably in a manner such that the elements of the heating device accommodated in the housing cannot be forced out of the housing by the uncoiling spring.

SUMMARY OF THE INVENTION

The object of the invention is to provide an electrical heating device of the type mentioned in the introduction, the layer structure of which can be more easily mounted in the housing. Furthermore, the object of the invention is to provide a simple method of manufacturing an electrical heating device of the type mentioned in the introduction.

For the solution of the device-related aspect the invention suggests an electrical heating device having the features of Claim 1. This differs from the generic class-forming state of the art in that the spring element is provided adjacent to a spring counter element. The spring element and the spring counter element interact such that spring tongues formed on the spring element can be brought into abutment against the spring counter element. Furthermore, the spring element and the spring counter element are provided for movement with respect to one another. Finally, the spring element has receptacles adapted to accommodate the spring tongues. The spring element and the spring counter element are here preferably provided in a parallel arrangement relative to one another, preferably with an alignment corresponding to the alignment of the layers of the layer structure within the housing. Normally, the spring element is located between the spring counter element and the housing. The spring element is normally retained stationary in the housing such that when the spring element generates the tension it is displaced, but the spring counter element remains at least predominantly unmovable in the housing. The spring counter element is subsequently movable in the housing preferably at the very most within the given production tolerance.

The further development according to the invention initially offers the possibility of integrating the spring element together with the spring counter element essentially stress-free in the housing together with the layer structure. With this stress-free layer structure the spring tongues are located in the spring counter element receptacles which have been formed, adapted for this. The spring element and the spring counter element are here normally located parallel to the layers of the layer structure and relatively close together. After the installation of all the elements of the layer structure and of the at least one spring element with the assigned spring counter element, the housing is closed. Thereafter, a relative movement between the spring element and the spring counter element takes place. The spring element is here preferably moved with respect to a spring counter element held stationary on the housing or formed by the housing itself. With this movement the spring tongues slide against the edge of the receptacles. The spring tongues preferably have in this respect a slope-shaped embodiment so that with an increasing sliding movement the spring tongues lead to the spring element lifting out relative to the spring counter element. Within the scope of this movement at right angles to the layers of the layer structure a spring tension is eventually established by which the layer structure is set in an assembly end position under adequate spring tension.

With the electrical heating device according to the invention the recesses and the spring tongues are mutually matched such that, due to a relative movement of the spring element and spring counter element in a direction parallel to the layers of the layer structure, the distance between the spring element and the spring counter element in a direction transverse to the layers of the layer structure is enlarged due to the spring tongues which are lifted out of the recess.

Claim 1 defines the heating device according to the invention with a spring which comprises a plurality of spring tongues. Nowadays only corresponding spring elements are known with a plurality of spring tongues. The intention of this invention is in particular to further develop an electrical heating device with a high thermal output. In this respect it is assumed that the spring element always has a plurality of spring tongues, which are provided, distributed over the whole length (extending parallel to the layers of the layer structure) along the spring element. It cannot be excluded however that the electrical heating device comprises merely one spring tongue and a spring counter element having a single receptacle formed to match the spring tongue. As far as that goes, the plural form chosen in Claim 1 for the normal case of an electrical heating device is to be read without it being expressed that a spring element with merely one spring tongue is located outside of the scope of protection. This reference is meant to expressly include very small electrical heating devices of this nature with low electrical power within the scope of protection.

According to a preferred further development the spring element is formed as a grid structure which has a plurality of recesses located one behind the other. In the longitudinal direction the spring element has a plurality of spring tongues arranged one behind the other. The spring tongues and the grid structure are formed mutually matched so that the spring tongues are accommodated in each case in an unstressed initial assembly position in a recess of the grid structure. In the assembly end position, in which the layer structure has been set under spring tension by a relative movement between the spring element and the spring counter element, the spring tongues are normally supported on ridges of the spring counter element which are provided between the recesses. With this embodiment the layer structure can be essentially reliably set under spring tension over its complete length in order to achieve adequate contacting of the PTC heating elements to the assigned electrical contacts. The basic form of the preferred embodiment presented above is merely one row of spring tongues with assigned grid structure. It is however conceivable to provide two or more rows of spring tongues in the height direction of the layer structure.

According to a further preferred embodiment of the invention, the spring tongues are formed from stamping and bending a spring metal sheet out of the plane of the spring metal sheet and more precisely in the shape of protrusions. These protrusions normally have an embodiment protruding in a convex manner over the assigned surface of the spring metal sheet. One end of the spring tongue is cut free in its longitudinal direction by stamping, i.e. separated with respect to the material of the spring metal sheet. The other end is normally joined as one part to the spring metal sheet. With the said preferred embodiment the freely cut end of the spring tongue is provided in the unstressed initial assembly position at the height of one of the ridges. Here the freely cut end can abut the ridge. However, in any case it is located at the level of the ridge, i.e. the free end extends over the ridge in the longitudinal direction of the spring metal sheet.

According to a preferred embodiment of the present invention, one end of the elongated spring element is formed by separation of an endless material of the spring metal sheet processed by stamping and bending at a point at which the spring tongue protrudes out of the plane of the spring metal sheet. Separation here normally occurs essentially in the centre of the bent-up spring tongue. This spring tongue, separated approximately in the centre, forms a retaining lug, which interacts in a locking manner with its free end in any case in the assembly end position with the spring counter element, i.e. it engages a recess formed from it. Even if the spring element is lifted out with respect to the spring counter element through displacing movement and interaction with the other spring tongues, the retaining lug formed in this way engages the assigned recess. The retaining lug accordingly acts as an end-stop when the spring element is moved relative to the counter element in a direction in which the freely cut ends of the spring tongues slide past over the edge of the assigned recess and prevent sliding back into the initial assembly position.

The previously discussed embodiment offers the advantage that the spring element can be manufactured as endless material by stamping and bending. By cutting an endless material of this nature at a predetermined point and from a spring tongue provided on the end side of the spring element a retaining lug is formed, which determines the extent of relative movement between the spring element and the spring counter element and defines an end position of the displacing movement.

According to a further preferred embodiment at least one entry opening for a clamping tool is provided on the spring element. This entry opening appears after the assembly of the housing and in the initial assembly position at a window which is left open on the housing and through which the clamping tool can be introduced into the engagement opening. Normally, the engagement opening is located near the edge of a side spar of the housing, because here a certain weakening of the housing material is not normally associated with substantial deflection of the spar which may be caused by the spring force.

Due to the preferred embodiment of the spring metal sheet as a longitudinal piece cut out of endless material, normally a number of engagement openings on the spring element are provided corresponding to the stamping pattern. However, only a few, optionally only one of the engagement openings are used for tensioning the spring by the relative movement between the spring element and spring counter element.

According to a preferred further development, which also leads to a certain thermal insulation between the spring element and the heating block and in this respect counters premature thermal fatigue in the spring element, the spring element is located between a housing longitudinal spar and the spring counter element. This thermal insulation is then already achieved when the spring counter element has only few recesses over its longitudinal extent. The spring counter element is normally formed from a thermally poor conducting plastic. Thermal insulation according to a type of cooling fin is then in particular provided when the spring counter element forms a relatively thin-meshed grid structure, i.e. merely the ridges and relatively thin-walled longitudinal ridges joining them are provided, whereby the overall area available for thermal conduction is reduced.

In order to avoid errors during the assembly of the heating device according to the invention the spring counter element preferably has a positional ridge protruding above the spring element. A positioning recess corresponding to the dimensions of this positional ridge is formed on the housing. The positional ridge and the positioning recess are preferably formed such that the unit of the spring element and spring counter element cannot be built into the housing in just any orientation. Of course, a plurality of positional ridges and a plurality of matching positioning recesses can be provided. Through appropriate key/lock embodiments between the spring counter element and the housing, a unique arrangement and orientation can be provided for each of the units of spring element and spring counter element provided in the housing. The arrangement of the positional ridges and the positioning recesses can be selected here such that each of the units of spring element and spring counter element can only be arranged at a predetermined point. Erroneous installation of the units is therefore reliably excluded.

With regard to sufficient ease of movement of the spring element and the spring counter element the latter preferably has at least one deposition section for the spring element. On this deposition section the spring element in any case slides along into its unstressed initial assembly position. It must be ensured that the oppositely situated and mutually interacting sliding surfaces of the spring element and spring counter element are as smooth as possible.

With regard to good deformability of the spring tongues it has proven to be advantageous if the surfaces of the ridges, in a direction transverse to the layers of the layer structure, are provided with a distance to a plane in which the deposition section extends. Here it is assumed that the ridges all lie in one plane, i.e. at least the ridge edges of the spring counter element interacting with the spring tongues are provided at the same height. An embodiment of this nature is however not mandatory. The edges can also be provided on different planes. Through individual matching of the edges or ridges and the assigned spring tongues, the amount of spring force which is generated at a predetermined point or on a predetermined section within the spring element can be influenced.

According to a further preferred embodiment of the invention which leads to simplified manufacture of the electrical heating device, the housing is composed of two identically formed housing parts. The housing lower part is thus formed identically to the housing upper part.

With regard to the process-related problem of this invention this invention suggests that the layer structure and the at least one spring element are initially deployed in the housing. The clamping of the layer structure generally occurs after the closure of the housing by displacing the spring element in a direction essentially parallel to the planes of the layer structure.

Here, the spring element can have spring tongues, which for example in the initial assembly position engage in the corresponding recesses formed on the housing. It is not necessary to provide a separate spring counter element. The spring counter element can accordingly also be formed as a constituent part of the housing. With an embodiment of this nature however the preferred thermal insulation between the spring element and the layer structure cannot be achieved, which is only possible with a separate spring counter element, which is provided between the layer structure and the spring element. The spring element can be displaced in the longitudinal direction and/or in the lateral direction parallel to the layers of the layer structure.

According to a preferred technique, on displacing the spring element a sliding slope, which is formed on a spring tongue of the spring element and which is accommodated in a recess of a spring element when the spring element is fitted into the housing, slides past an edge of the recess and thus tensions the spring element.

Further details and advantages of the invention are given in the following description of an embodiment in conjunction with the drawing. The drawing shows the following:

BRIEF DESCRIPTION OF THE DRAWINGS

FIG. 7 a perspective side view of the spring element and the spring counter element;

FIG. 8 the detail VIII illustrated in FIG. 7 in an enlarged illustration;

FIGS. 11A to 11C the detail outlined in FIG. 10 in an enlarged illustration with a partly cut-away housing in different phases during stressing the spring device.

DETAILED DESCRIPTION OF THE PREFERRED EMBODIMENTS

Figure 1:
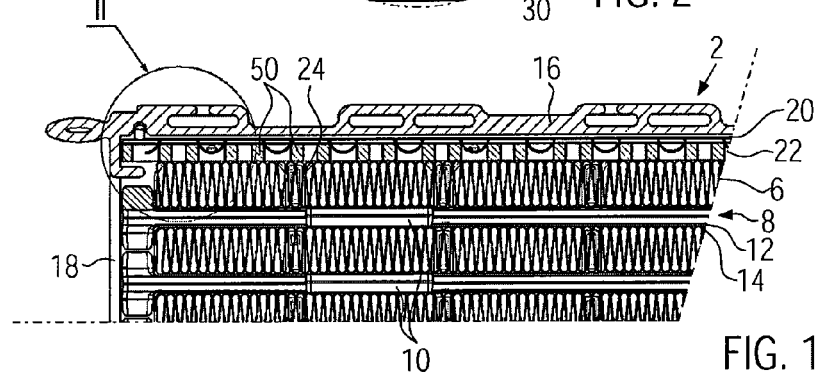
FIG. 1 a cross-sectional view of the embodiment of the initial assembly position.
Figure 3:
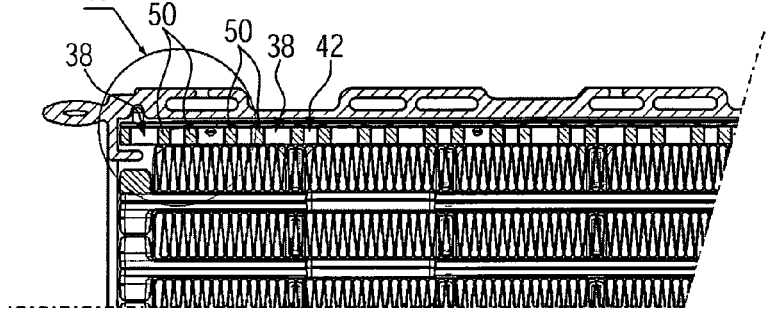
FIG. 3 a cross-sectional view of the embodiment of the assembly end position.

FIGS. 1 and 3 show a longitudinal section of the embodiment with a housing 2 in which a layer structure 4 is accommodated. In the illustrated embodiment the layer structure 4 consists of a plurality of parallel extending layers of radiator elements 6, which are formed from sheet metal band, which is bent in a meander-type manner. Between the individual radiator elements 6 there are the heat emitting elements 8. These heat emitting elements 8 comprise a plurality of PTC heating elements 10 provided one behind the other in a plane between sheet metal bands 12. The sheet metal bands 12 supply the current to the PTC heating elements 10. Here, the electrical heating device is formed as a high voltage heating device. The respective radiator elements 6 exposed at the openings of the housing 2 are accordingly provided electrically insulated from the electrically conducting sheet metal bands 12. To achieve this, a ceramic insulating layer 14 is provided between the radiator elements 6 and the sheet metal bands 12.

The housing 2 comprises the longitudinal spars 16 and the transverse spars 18, which are provided here extending at right angles to one another. The longitudinal spars 16 extend parallel to the layers of the layer structure 4.

A spring element 20 and a spring counter element 22 are located between the longitudinal spar 16 and the outer radiator element 6. The spring element 20 is located adjacent to the inner surface of the longitudinal spar 16 and interacts with this inner surface. The spring counter element 22 is located between the outer radiator element 6 and the spring element 20. On the inner surface of the spring counter element facing the outer radiator element 6 a retaining band 24 of sheet metal strip is provided which forms a locating face for the outer edge of the outer radiator element 6.

Figure 5:
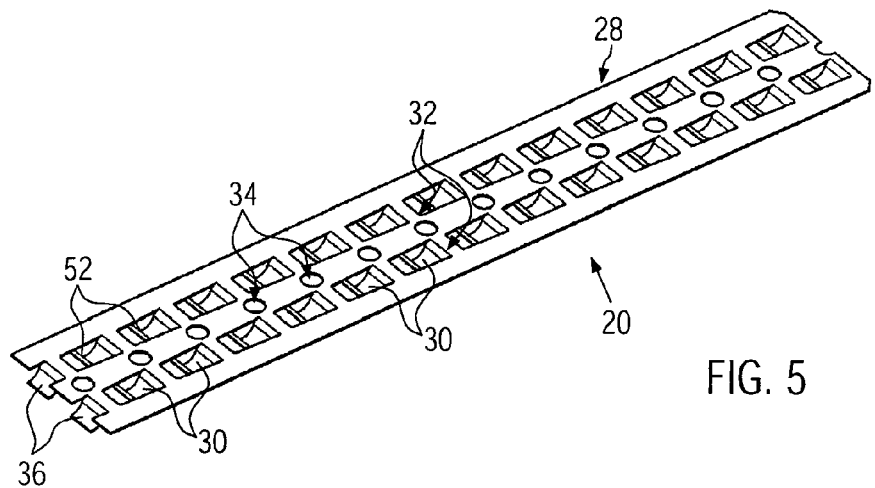
FIG. 5 a perspective side view of the spring element of the illustrated embodiment.

As FIG. 5 in particular expressively shows, the spring element 20 is formed from an elongated sheet metal strip 28 by stamping operations. Within the scope of these stamping operations spring tongues 30 are cut out of the sheet metal strip 28 at constant intervals. Then the spring tongues 30 are merely joined on one side with the material of the sheet metal strip 28. Here two rows 32 of spring tongues 30 are provided. In the longitudinal direction of the spring element 20 stamped engagement openings 34 are formed between both rows 32. The engagement openings 34 are located in a row in the centre of the spring element 20.

On the end illustrated in FIG. 5 the plane of the sheet metal strip 28 protrudes through a retaining lug 36 in the direction of the spring tongues 30. This retaining lug 36 is primarily a protrusion of the sheet metal strip 28 forming a spring tongue 30 which has been parted in approximately the height of the highest elevation relative to the sheet metal strip 28. At this point the spring element 20 was separated from an endless material forming the spring element 22.

Figure 6:
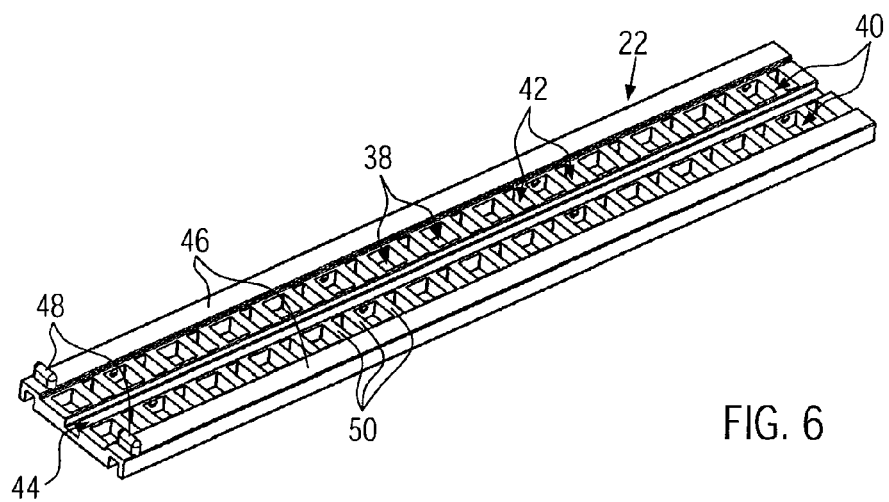
FIG. 6 a perspective side view of the spring counter element of the illustrated embodiment.

The spring counter element 22 illustrated in FIG. 6 has receptacles 38 corresponding to the number and position of the spring tongues 30 formed on the spring counter element 22. Accordingly, two rows 40 of receptacles 38 are located parallel to one another. The receptacles 38 are formed such that the spring tongues 30, protruding over the sheet metal strips 28 in a convex manner, essentially fit into the receptacles 38 (cf. FIG. 2). Between two receptacles 38 there is in each case a recess 42, the dimension of which in the longitudinal extent of the spring counter element 22 is substantially smaller than the dimension of the receptacle 38. A groove 44, the bottom of which is deeper than the surface of the spring counter element 22 in the region of the rows 40, is left free between the adjacent rows 40. On the outer side of the spring counter element 22 this forms two deposition sections 46, which are surmounted on one side by a positional ridge 48, which rises up at one end of the spring counter element 22. The deposition sections 46 surmount that plane in which the ridges 50 are provided, which separate the recesses 42 or the receptacles 38 from one another.

Figure 2:
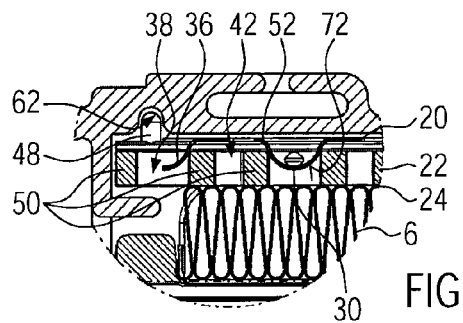
FIG. 2 detail II according to FIG. 1 shown enlarged.

After the preassembly of the unit formed from the spring element 20 and the spring counter element 22, the spring element 20 contacts the edge deposition sections 46 of the spring counter element 22 with its edge surface which is surmounted by the spring tongues 30. The spring tongues 30 engage in each case one of the receptacles 38. Due to the groove 44 a certain distance is provided between the sheet metal strip 28 in the region of the engagement openings 34 and the spring counter element 22 (cf. FIG. 8). The retaining lugs 36 engage the assigned receptacle 38 (cf. FIG. 2). In contrast the free ends of the spring tongues 30 are located at the level of the assigned ridges 50. As the illustration in FIG. 2 shows, the free ends, which are labelled in FIG. 2 with the reference numeral 52, lie in a direction transverse to the layers of the layer structure on the outside and behind the assigned ridge 50.

Figure 4:
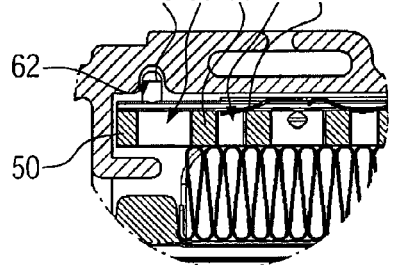
FIG. 4 detail II according to FIG. 1 shown enlarged.
Figure 9:
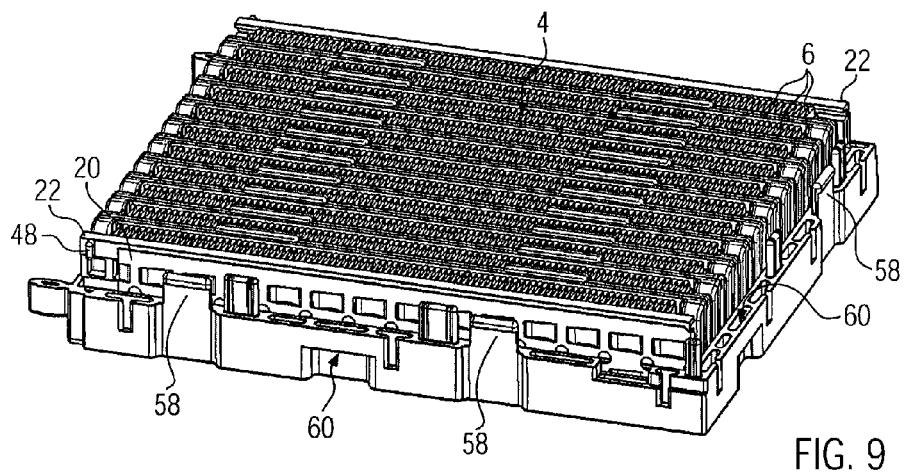
FIG. 9 the embodiment in a perspective side view with the housing open.
Figure 10:
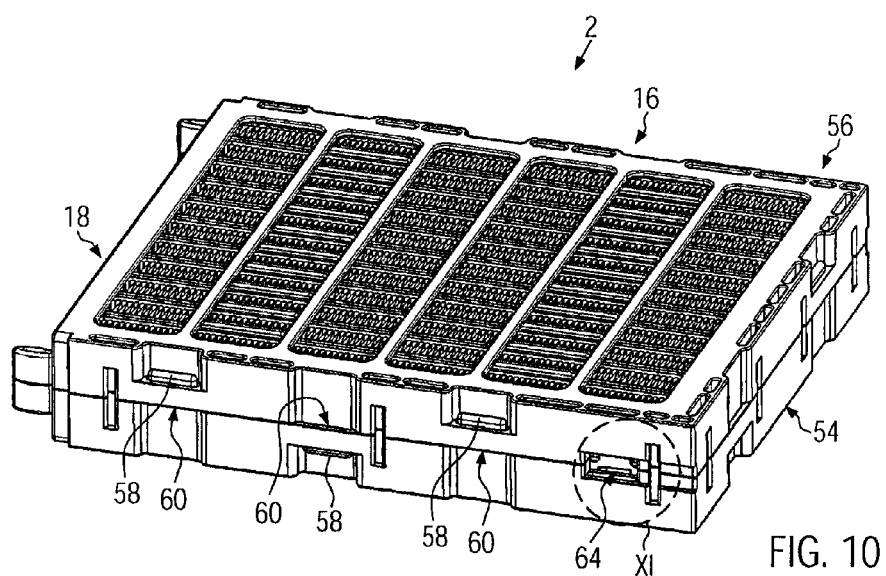
FIG. 10 the illustration according to FIG. 9 with the housing closed.

FIG. 9 illustrates a housing lower part 54 filled with the layers of the layer structure 4 and the respective units, provided on the edge, comprising the spring element and spring counter element 20, 22. The outwardly aligned spring element 20 can be clearly seen on the front side. The housing upper part 56, illustrated in FIG. 10, is placed on the housing lower part 54, prepared in this way. The housing 2 is now closed. As can be seen, the housing upper part and the housing lower part 54, 56 are formed identically. On the broad surfaces the housing parts 54, 56 have offset latching springs (58) and correspondingly formed latching grooves 60 provided, which interact to secure a locking position of the housing 2. Once the housing 2 is closed, the layers of the layer structure 4, the spring elements 20 and the spring counter elements 22 are located essentially with no play, but without substantial tension against one another and between the oppositely situated inner surfaces of the longitudinal spars 16. As FIGS. 2 and 4 illustrate, the housing 2 has in the corner region of the longitudinal spars 16 a positioning recess 62 in which the positional ridge 48 has to engage. Otherwise, the housing 2 cannot be filled in the desired manner with the required elements of the layer structure and with the two spring elements and counter elements 20, 22. In this respect, the interaction of the positional ridge 48 with the positioning recess 42 has the effect that the unit comprising the spring element and the spring counter element cannot be built into the housing 2 in the wrong orientation.

FIGS. 9 and 10 show a window 64 let into the housing 2, providing at least one, preferably two of the engagement openings 34 with the housing closed. The window 64 is formed such that the engagement openings 34 can be gripped by a clamping tool 66 which is illustrated in FIGS. 11A to 11C. For this the clamping tool 66 has a spigot 70, which can be introduced into the engagement opening 34 and which protrudes from a handle section 68. Here, the groove 44 facilitates the spigot 40 to penetrate the sheet metal strip 28 so that the spigot 70 does not unintentionally slip out of the engagement opening 34 when the spring of the spring element 20 stresses. A set of tools for prestressing the layer structure normally comprises two clamping tools 66, which are simultaneously arranged at the side on the housing 2 with the respective spigot 70 in the corresponding engagement opening 34. It is self-evident that the engagement opening 34 can have different geometrical embodiments. Here, a round engagement opening 34 is illustrated. The engagement opening 34 can just as well be oval or polygonal.

Through the longitudinal displacement of both clamping tools 66 the spring element 20 is moved relative to the spring counter element. With this displacement movement the free end 52, initially protruding beyond the ridge 50, of each spring tongue 30 is initially passed by the receptacle 38 assigned to the spring tongue 30. Here a sliding slope 72 provided adjacent to the fixed end of a spring tongue 30 and formed by the respective spring tongue 30 slides along an edge of the ridge 50, through the right one in each case in FIGS. 2, 3, to a receptacle 38. The spring element 20 is accordingly spaced relative to the spring counter element 22 and forced outwards in the direction of the assigned longitudinal spar 16 and stressed with a pretension between it and the spring counter element 22. Here all the spring tongues 30 are bent elastically and spring-tensioned. The layer structure is thus placed under spring tension. The displacing movement ends when the spring tongues 30, which are convexly curved outwards, engage the recesses 42. The retaining lug 36 here engages the first recess 42 on the edge. The free end of the retaining lug 36 here is located deeper than the plane in which the surface of the ridges 50 is located. Thus, this prevents the spring element 20 from being unintentionally reset from this assembly end position into the initial assembly position illustrated in FIG. 1 or FIG. 2. Also, the spring element 20 cannot be displaced beyond the assembly end position, because the other end of the spring element 20 remote from the retaining lug 36 is located in the assembly end position on or close to the inner surface of the transverse spar 18 which prevents any further displacement of the spring element 20.

The present invention is not restricted to the illustrated embodiment. It is possible without further ado to clamp the layer structure 4 by merely one spring element 20 with the assigned spring counter element 22. If required, spring elements with the assigned spring counter elements 20, 22 can be provided not only on the edge, but rather also within the layer structure 4. The spring elements can surmount the housing 2 just as well via the transverse spar 18. Also, the spring elements 22 can have a positioning recess which protrudes beyond the layer structure 4 on the upper or lower side (i.e. in the direction of flow of the medium flowing through the heating block).

The invention claimed is:

1. An electrical auxiliary heating device for motor vehicles, comprising:
    an open housing;
    a layer structure accommodated in the housing, the layer structure comprising at least one radiator element, at least one heat emitting element, and at least one spring element keeping the layer structure under tension, the spring elements having spring tongues and the heat emitting element having at least one PTC heating element, wherein:
    a spring counter element is provided adjacent and movable with respect to the spring element and exhibits receptacles formed to accommodate the spring tongues, and wherein
    the layer structure, the spring element, and the spring counter element are arranged in the open housing stress-free as the spring tongues are arranged in associated receptacles of the spring counter element, and wherein
    during assembly, the spring counter element interacts with the spring tongues of the spring element such that, through a relative sliding displacement of the spring element against the spring counter element, the spring element is raised with respect to the spring counter element to tension the spring element and put the layer structure under tension.

2. An electrical auxiliary heating device according to claim 1, wherein the spring counter element has a grid structure forming recesses, and wherein a plurality of spring tongues are provided in a longitudinal direction one behind the other and are supported on ridges of the spring counter element which are provided between the recesses.

3. An electrical auxiliary heating device according to claim 2, wherein the spring tongues are formed by stamping and bending as protrusions protruding out of a plane of a spring metal sheet, and wherein an end of each of the spring tongues, cut free by stamping, is provided in an unstressed initial assembly position at the height of one of the ridges.

4. An electrical auxiliary heating device according to claim 3, wherein one end of the spring element is formed by separation of an endless material of the spring metal sheet processed by stamping and bending at a point at which the spring tongues protrude out of the plane of the spring metal sheet.

5. An electrical auxiliary heating device according to claim 1, wherein at least one engagement opening for a clamping tool is provided on the spring element, and wherein a window is formed on the housing for fitting the clamping tool into the engagement opening.

6. An electrical auxiliary heating device according to claim 1, wherein the spring element is provided between a housing longitudinal spar and the spring counter element.

7. An electrical auxiliary heating device according to claim 1, wherein the spring counter element has a positional ridge surmounting the spring element, wherein the housing forms a positioning recess matched for the receptacle of the positional ridge, and wherein the positional ridge and the positioning recess are formed such that a unit formed by the spring element and the spring counter element cannot be built into the housing in any random orientation.

8. An electrical auxiliary heating device according to claim 1, wherein the spring counter element forms at least one deposition section for the spring element on which the spring element can slide, and wherein the surfaces of the ridges extend in a plane at a distance to the plane accommodating the deposition section.

9. An electrical auxiliary heating device according to claim 1, wherein, between the receptacles, recesses are provided through the interaction of which with the spring element in an assembly end position in which the layer structure is put under spring tension by the spring element is thereby secured.

10. A method for producing an electrical auxiliary heating device for a motor vehicle, including an open housing comprising a housing lower part, and including a layer structure accommodated in the housing, the layer structure comprising a spring element having a spring tongue, a spring counter element, at least one heat emitting element including at least one PTC heating element, and a radiator element, wherein the layer structure is held under tension in the housing by the spring element, the method comprising:
  placing the layer structure, the at least one spring element, and the at least one spring counter element in the housing and arranging the spring tongue in associated receptacles of the spring counter element as the layer structure is stress-free; and then
  slidingly displacing the spring element against the spring counter element in a direction essentially parallel to the planes of the layer structure to tension the spring element and clamp the layer structure in the housing.

11. A method according to claim 10, wherein, upon slidingly displacing the spring element and the spring counter element, a sliding slope on the spring tongue of the spring element slides past on an edge of the receptacle and thus tensions the spring element, the sliding slope being accommodated in a receptacle of a spring counter element when the spring element is fitted into the housing.

12. A method according to claim 11, wherein the spring element is displaced between the spring counter element and the housing.

13. An electrical auxiliary heating device for a motor vehicle, comprising:
  an open housing;
  a layer structure accommodated in the housing, the layer structure comprising at least one radiator element, at least one heat emitting element including at least one PTC heating element, and at least one spring element holding the layer structure under tension, the spring elements having spring tongues;
  a spring counter element that is located adjacent to the spring element and that is movable with respect to the spring element, the spring element having receptacles formed therein that receive the spring tongues, wherein the spring counter element interacts with the spring tongues such that, through a relative sliding displacement of the spring element against the spring counter element, the spring element is raised with respect to the spring counter element in a direction essentially parallel to the plane of the layer structure to tension the spring element and put the layer structure under tension.

\* \* \* \* \*